(12) United States Patent
Cigada et al.

(10) Patent No.: US 8,365,593 B2
(45) Date of Patent: Feb. 5, 2013

(54) HYDRAULIC MONITORING UNIT

(75) Inventors: Alfredo Cigada, Milan (IT); Francesco Ballio, Milan (IT); Fabio Inzoli, Cesano Maderno (IT)

(73) Assignee: Politecnico di Milano, Milan (IT)

( * ) Notice: Subject to any disclaimer, the term of this patent is extended or adjusted under 35 U.S.C. 154(b) by 435 days.

(21) Appl. No.: 12/670,315

(22) PCT Filed: Jul. 11, 2008

(86) PCT No.: PCT/EP2008/059075
§ 371 (c)(1),
(2), (4) Date: Jan. 22, 2010

(87) PCT Pub. No.: WO2009/013151
PCT Pub. Date: Jan. 29, 2009

(65) Prior Publication Data
US 2010/0206067 A1   Aug. 19, 2010

(30) Foreign Application Priority Data
Jul. 26, 2007   (IT) .............................. MI2007A1506

(51) Int. Cl.
G01F 23/00   (2006.01)

(52) U.S. Cl. ........................................ 73/292

(58) Field of Classification Search ................. 73/64.55, 73/292, 291
See application file for complete search history.

(56) References Cited

U.S. PATENT DOCUMENTS
4,603,580 A * 8/1986 Waring ........................... 73/295
7,392,691 B1 * 7/2008 Yeckley ...................... 73/64.55

FOREIGN PATENT DOCUMENTS
WO   WO 9106833 A1 *   5/1991

* cited by examiner

Primary Examiner — Peter Macchiarolo
Assistant Examiner — Tamiko Bellamy
(74) Attorney, Agent, or Firm — Notaro, Michalos & Zaccaria P.C.

(57) ABSTRACT

The present invention concerns a device (1) for measuring the position of the bed and surface of a river, in which the device comprises a support (2) along which a plurality of measurement areas (5) and means (3, 5) suitable for determining the local heat dissipation in each measurement area (5) are defined; the present invention also concerns a method for determining the position of such interfaces, in which a device (1) according to the present invention is arranged so that it intersects the interface, ensuring that one or more measurement areas (5) are immersed in each of the means constituting the interface and finding the value of the power dissipated in the measurement areas (5) from the temperature measured at said means.

12 Claims, 6 Drawing Sheets

HYDRAULIC MONITORING UNIT

The present invention refers to a hydraulic monitoring unit, suitable for detecting the position of the solid-liquid and liquid-aeriform interfaces, for example to evaluate the condition of the piers that support river bridges or, more in general to monitor the phenomena of raising-lowering of the river bed.

The monitoring of the position of such interfaces is particularly important in the case of watercourses subject to rapid variations in flow rate: sudden increases in flow rate, for example due to heavy rain, can generate erosion phenomena at the base of river piers, with consequent decrease in the useful load capacity of the bridge they support, increasing the risk of collapse.

Therefore there is a clear need to develop techniques for evaluating the evolution over time of the position of the river bed.

A first methodology for measuring such a position involves an echo sounder: by measuring the time needed for an acoustic signal to come back after being reflected from the bed, it is possible to determine the depth of the river; this system however, has some criticalities, and in particular the need for accurate assembly and armour-plating to withstand the stresses and to avoid potential obstructions caused by the materials transported by the currents, as well as the possibility of significant noise levels and possible measurement errors due to dynamic fluid disturbance (turbulence, bubbles, transported material). The echo sounders must also be oriented so as to not sense the presence of the structure that they are monitoring and, therefore, they do not allow the bed to be detected in the positions immediately adjacent to the structure itself.

A second methodology uses a temperature profile sounder, which measures the temperatures at different depths. This system takes advantage of the fact that, normally, the water temperature is different from those of the surrounding ground and air.

Temperature profile sounders are relatively simple to install, but can be unreliable, for example in the case of thermal inversion in the water, or if—for example in winter—it is impossible to notice any difference between the temperature of the air and of that of the water; moreover, since at the solid-liquid interface of a river the ground is soaked in water, it is not always possible to determine the position of such an interface with adequate precision. Moreover, such measurement methods, generally based upon thermocouples, require complex electrical insulation systems when immersed in water.

In view of the described state of the art, the purpose of the present invention is that of making a device which is even more precise and reliable than those known in the prior art. In particular, it is the intended to at least partially mitigate the drawbacks of the most common methods, due to the large bulk of the components and to their sensitivity to humidity, to the sensitivity of the measurement to disturbance induced by the current during floods (turbulence, bubbles, floating debris, sediment in suspension), and to the drift typical of electronic components.

In accordance with the present invention, such a purpose is reached by a device in accordance with claim 1 and/or by a measurement method according to claim 11.

The characteristics and the advantages of the present invention shall become clear in the following detailed description of a practical embodiment, given as an example and not for limiting purposes with reference to the attached drawings, in which.

Figure 1:
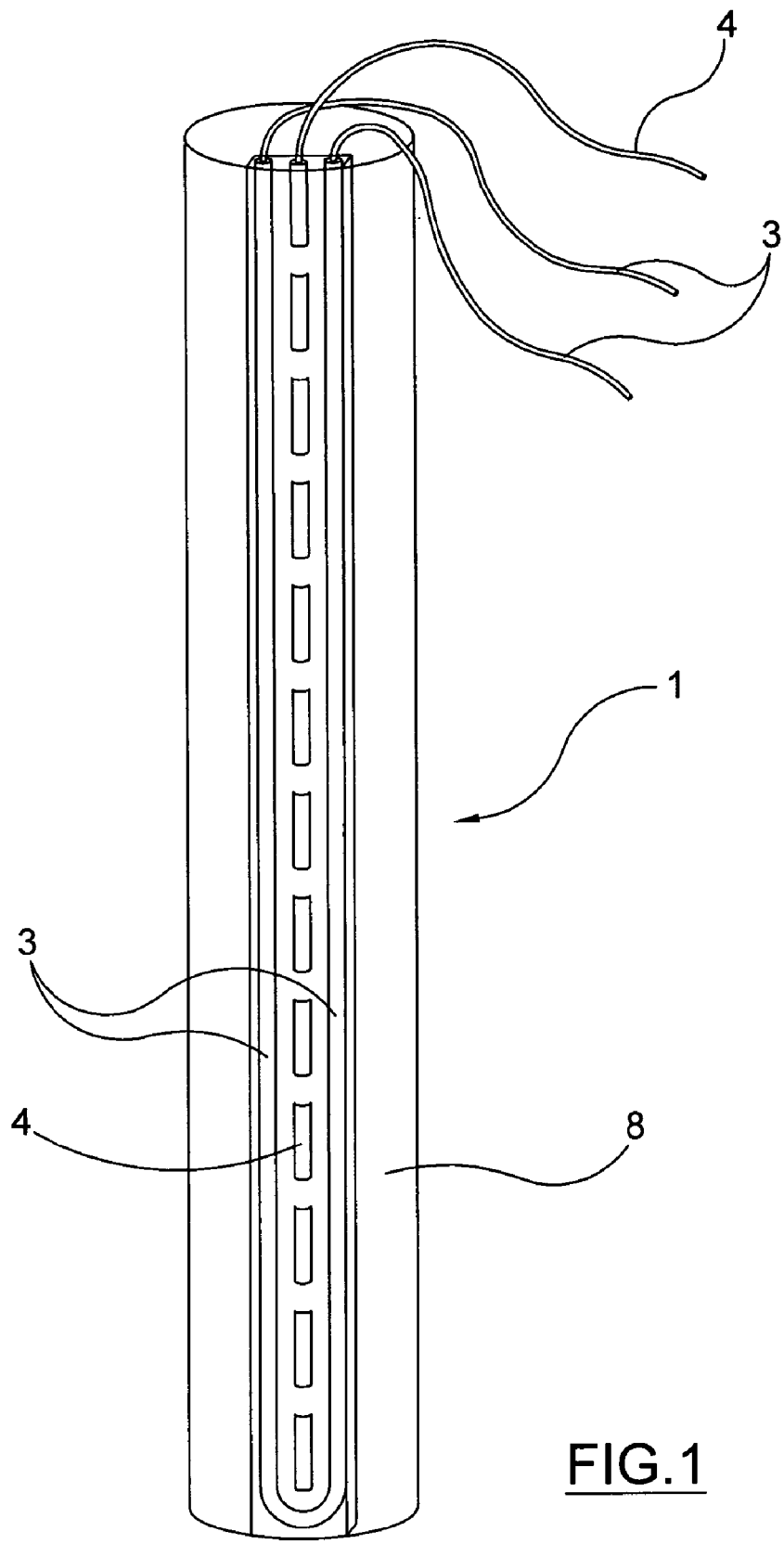
FIG. 1 shows a schematic view of a device according to the present invention applied onto a pier of a bridge.

With reference to the figures, the measurement device according to a preferred embodiment of the present invention is globally indicated with 1. In the figures, the device 1 is represented applied onto the pier of a bridge; in FIGS. 2, 3 and 4, the water medium, representing the water of a river, is indicated with the letter A.

The device 1 comprises a support 2, heat generating means 3, for example electrical resistances, and a temperature probe 4, on which a plurality of measurement areas 5 are made, spaced apart from one another.

The support 2 has a portion of its own surface which is not thermally insulated from the external environment, i.e. the medium in which it is immersed; in the embodiments represented in the figures, such a non-thermally insulated surface is indicated with 9; consequently the other surfaces are coated with a thermal insulator 10.

Figure 2:
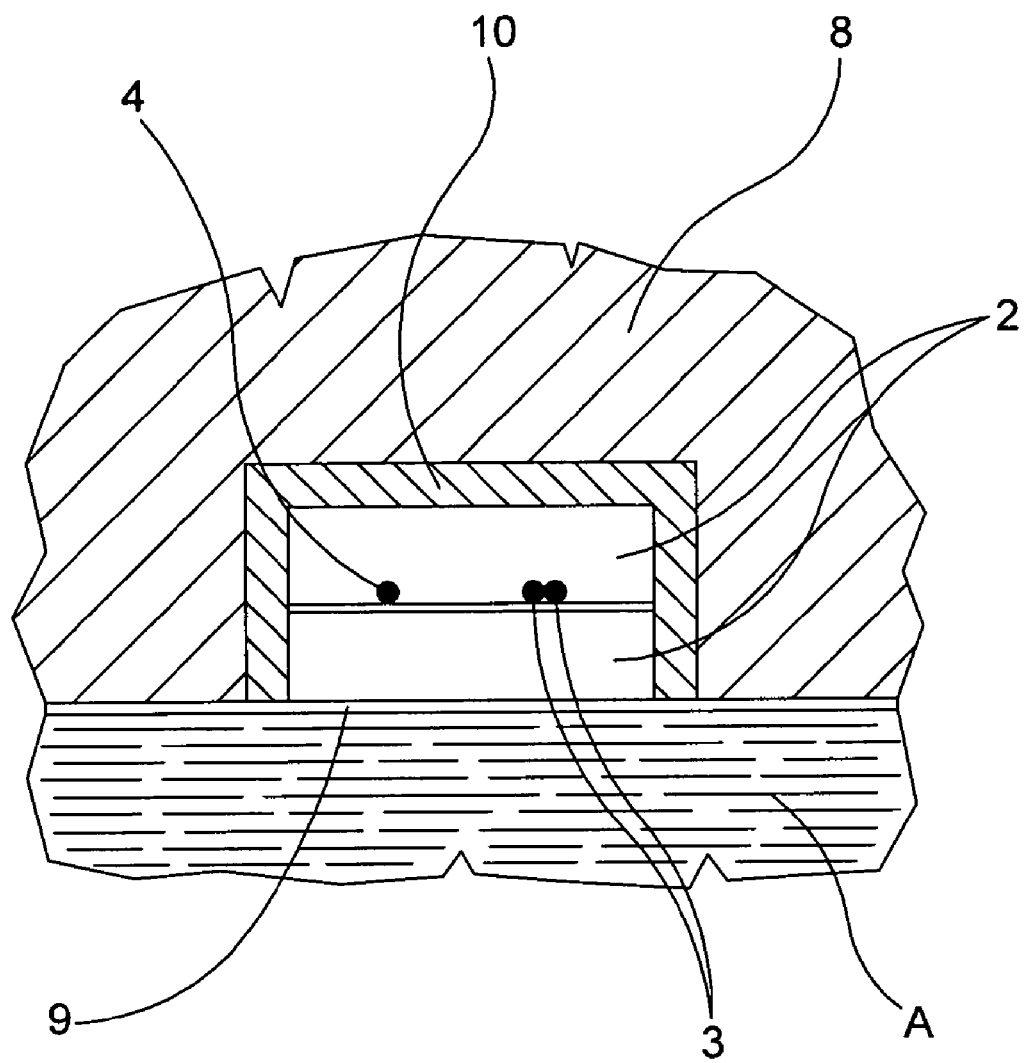
FIG. 2 shows a schematic view of a cross section of a first preferred embodiment of the device of the present invention.
Figure 3:
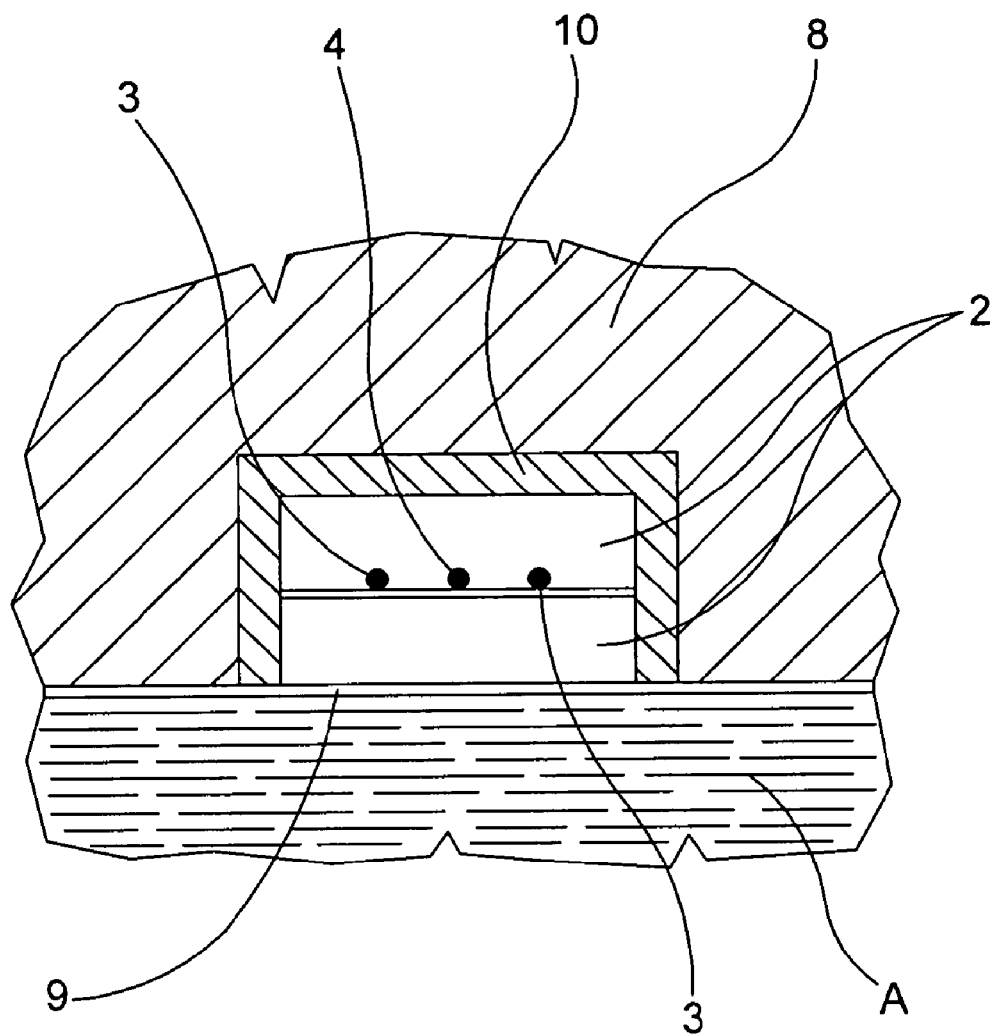
FIG. 3 shows a schematic view of a cross section of a second preferred embodiment of the device of the present invention
Figure 4:
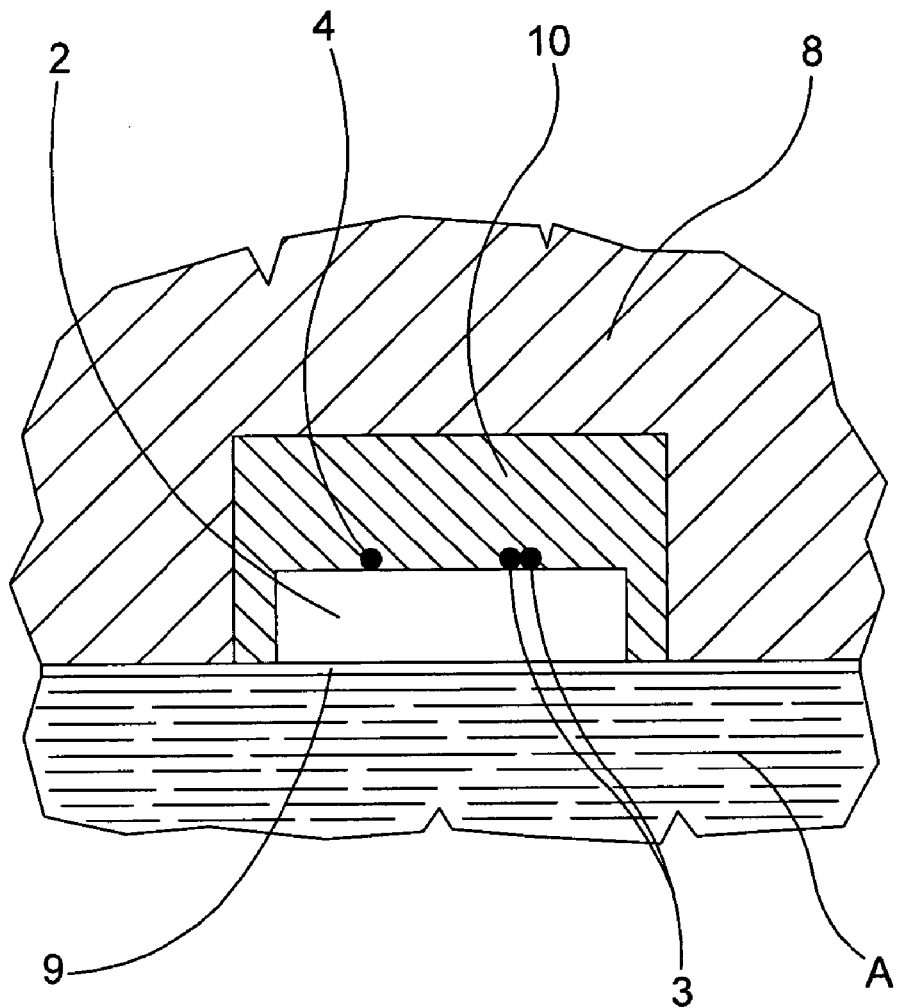
FIG. 4 shows a schematic view of a cross section of a third preferred embodiment of the device of the present invention.

In the embodiments of FIGS. 2 and 3, for example, the support 2 comprises a sandwich structure inside of which the heat generating means 3 and the temperature probe 4 are inserted.

Advantageously, the temperature probe 4 comprises an optical fibre for measuring the temperature for example comprising Bragg lattices 6 within, which define the measurement areas 5.

The operation of the temperature probe 4 with Bragg lattices is as follows: through a luminous beam of a suitable wavelength it is possible to determine whether the Bragg lattice 6 has undergone deformations compared to a known reference configuration, and therefore calculate the temperature of the optical fibre (or rather of the temperature probe 4) at the measurement area 5.

This temperature measuring technique is already known per se and therefore will not be described any further.

Figure 5:
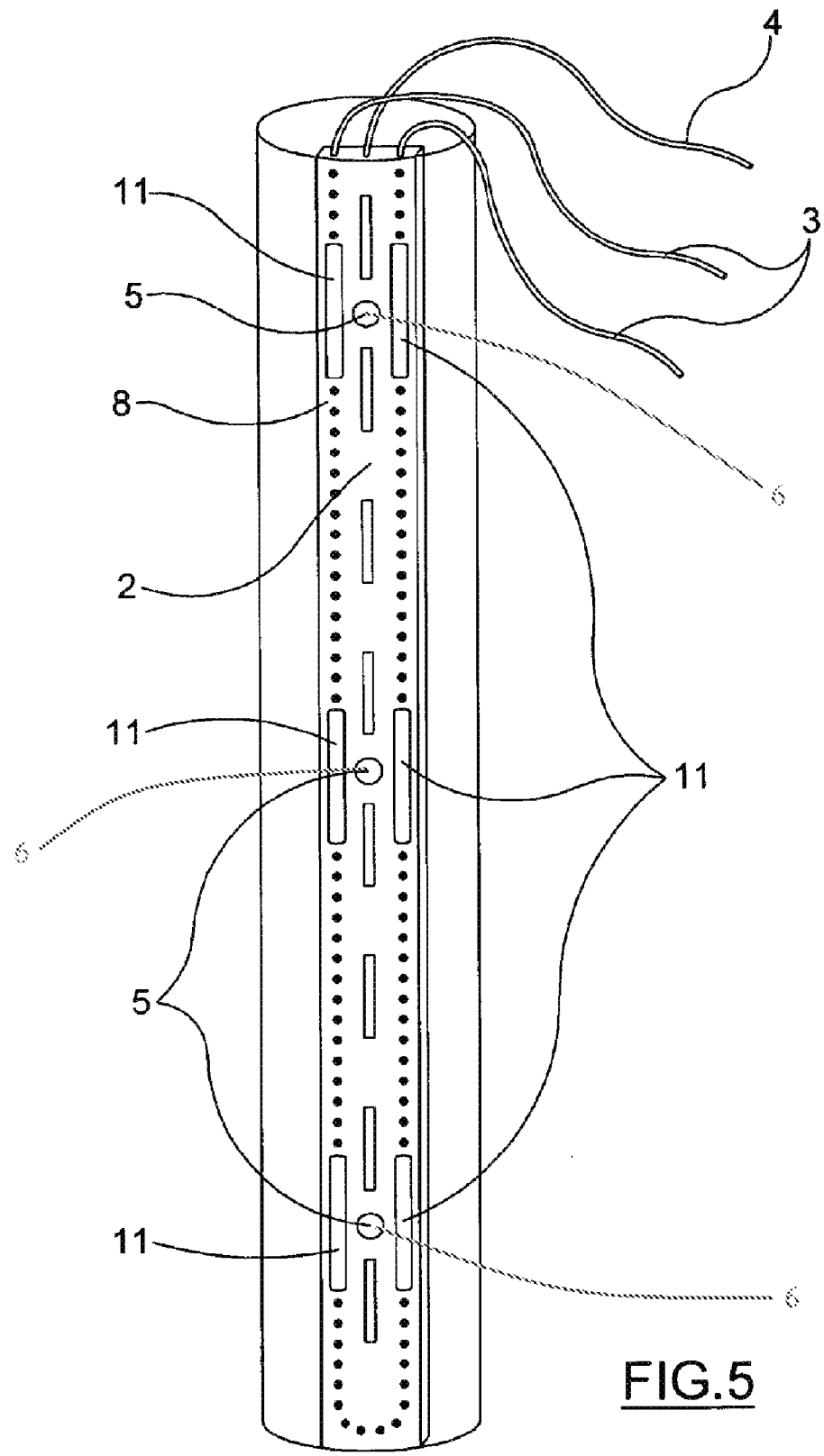
FIG. 5 shows a schematic view of a forth preferred embodiment of a device according to the present invention applied onto a pier of a bridge.
Figure 6:
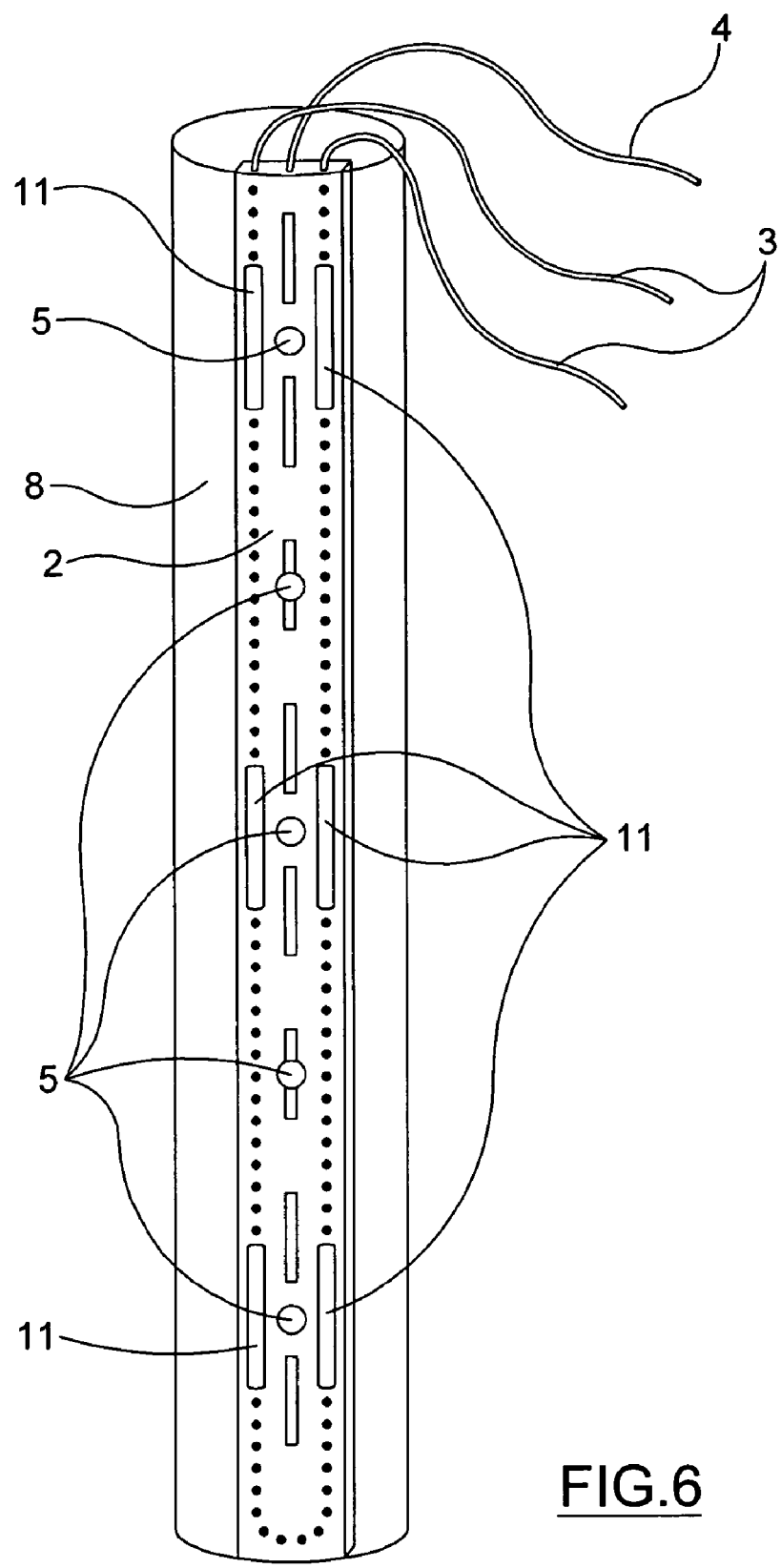
FIG. 6 shows a schematic view of a fifth preferred embodiment of a device according to the present invention applied onto a pier of a bridge.

As can be seen in FIGS. 5 and 6, the heat generating means can be made for example with a cable comprising heating portions 11, in which most of the heat production occurs, alternating with portions having low heat dissipation; the heating portions 11 can advantageously be arranged at the measurement areas 5. In this way the consumption of the device 1 is reduced to the minimum necessary.

The support 2 is moreover connected to suitable processing means, for measuring the temperature in the measurement area 5; for the purpose of the present invention the physical position of such processing means is not relevant: they can be arranged either completely in the proximity of the device 1, or in a distributed way, at least partially in a remote position.

A preferred way of operating of the device 1 for measuring the position of the solid-liquid or liquid-aeriform interface shall now be described.

The device 1 as previously described must be arranged across the interfaces the position of which one wishes to measure. For example, should one wish to measure the solid-liquid and liquid-aeriform interfaces of a watercourse, the device 1 can be fixed for example to a supporting pier 8 of a bridge, so that a substantial portion of the support 2 is immersed in each of the solid, liquid and aeriform media.

By "a substantial portion" it is meant a portion comprising one or more measurement areas 5.

During the measurement, the heat generating means 3 are energized, so as to increase the temperature near each measurement area 5. In this way, since the heat exchange coefficient between the device 1 and each of the three solid, liquid and aeriform media is different, the heating produced by the heat generating means 3 will have different effects in each means and the temperature measured will therefore be different.

Indeed, the temperature measured will for example be at its minimum in the liquid medium, where the device, immersed into a liquid current with a relatively low temperature, will rapidly give its heat away to the flowing liquid.

The measured temperature in the solid medium, on the other hand, where the heat exchange coefficient substantially coincides with the heat exchange coefficient of the solid medium itself, will certainly be greater, with an abrupt increase of the temperature right at the solid-liquid interface.

In fact, since the solid medium is not normally compact, the spatial variation of the heat exchange coefficient will be made milder by phenomena such as movement of the upper layers of the solid medium and/or the infiltration of the liquid medium inside the surface layers of the solid medium. The variation in the heat dissipation coefficient is in any case sufficiently clear so as to allow a sufficiently precise measurement of the position of the interface.

Equally, the temperature measured at the measurement areas 5 exposed to air will be higher than that measured at the measurement areas 5 immersed into water, due to the different characteristics of heat conducting properties of the two fluids.

The position of the liquid-aeriform interface can also be determined at an abrupt variation in the temperature profile thus obtained.

Since the temperature measured depends on both the heat exchange coefficient and on the difference in temperature between the outside temperature and the temperature of the heat generating means 3, it will be possible to adapt the operation of the device 1 to different environmental conditions, for example increasing or decreasing the power dispersed by the heat generating means 3 to avoid two different measuring points relative to two different media (e.g. solid, liquid or aeriform) accidentally having the same temperature value, because of a particular combination of temperature difference and heat exchange coefficient.

The power supplied to the heat generating means 3 can therefore be selected so that determining the position of the interfaces is not influenced by the small natural temperature variations of each medium (for example, the temperature of the water of a river can vary by 0.1° C. in the space of twenty-four hours).

It is also possible to foresee one or more measuring points in one, in two or in all the different media, wherein there is no heat dissipation, so as to have a reference point against which to assess the reading of the measurement areas 5.

The embodiment of FIG. 6 is an example of this arrangement: in it, the heat generating means 3 generate heat only near to some measurement areas 5; more precisely the measurement areas 5 are alternatively free of heating portions and close to heating portions 11 of the heat generating means.

A preferred embodiment of the present invention foresees that the heat generating means 3 be supplied with a power equal to about 0.5 W/m.

The distance D between the measurement areas determines the spatial resolution of the device 1 according to the present invention. For the purposes of measuring the position of interfaces, it is considered that a value less than 3 m, preferably less than 1 m, for example of about 50 cm, is sufficient. In any case, it is considered that D must be less than 10 m to achieve the purposes of the present invention.

Advantageously, it is possible to foresee a constant distance D between successive measurement areas 5, or the measurement areas 5 can be more concentrated in portions where a greater spatial resolution is desired.

As can be seen, the present invention is particularly suitable for determining, also remotely, the variation in the level and in the position of the river beds, in particular for the research and the monitoring of erosion in piers of bridges.

Consequently, there are various ways in which it is possible to arrange the devices according to the present invention onto a bridge.

For example it is possible to arrange a plurality of devices around a pier 8, to monitor the variation in position of the interface depending on the position compared to the current of the river; or it is possible to place one or more devices on some or onto all the piers; the devices can be placed linearly onto the piers, into a U shape or into a spiral (fully or else just partially), with advantages that a man skilled in the art would immediately understand.

Of course, a man skilled in the art, can bring numerous modifications and variations to the configurations described above, in order to satisfying contingent and specific requirements.

For example, although the present invention has been described with particular reference to the measurement of solid-liquid and/or liquid-aeriform interfaces inside a watercourse, it is clear that the use is not necessarily limited to this application, but it can be extended to the measurement of the position of any interface between two distinct phases having different thermal conductivity.

Furthermore, the present device could also be made with two temperature probes fixed, for example parallel to one other, on the same support 2, or with a first temperature probe fixed on the support 2 and a second temperature probe substantially thermally independent from the first but physically arranged near to it. The second probe could for example be inserted directly into each means, so as to provide a reference reading with which to evaluate the temperature dispersion more precisely.

In this case it is possible to solve the problems caused by the situation in which the same heat dissipation is detected between two distinct media, but this is caused by two different heat exchange coefficients compensated by two different thermal jumps. This situation occurs for example with very cold air (low heat exchange coefficient but very high temperature difference) and hotter water but flowing (high heat exchange coefficient and small temperature difference). All these modifications are anyhow covered by the scope of protection of the invention as defined by the following claims.

The invention claimed is:

1. A device for measuring the position of solid-liquid and liquid-aeriform interfaces inside flowing water, comprising:
   a substantially longitudinal support for being applied onto a pier of a bridge, along which a plurality of temperature measurement areas are defined;

wherein said support contains temperature probes active on said temperature measurement areas for determining the local dissipation of heat in each of said temperature measurement areas;

heat generating means designed for increasing the temperature near to said temperature measurement areas; and wherein said support has a portion of thermally insulating material designed for thermally insulating said support from the pier of the bridge in a region wherein the support contacts the pier of the bridge.

2. The device according to claim 1, wherein said temperature probe comprises an optical fibre.

3. The device according to claim 2, wherein said measurement areas are areas in which there is a Bragg lattice.

4. The device according to claim 3, wherein the distance between two consecutive measurement areas is less than 3 meters.

5. The device according to claim 1, wherein said heat generating means comprise a resistance.

6. The device according to claim 1, wherein said heat generating means comprise heating portions alternating with portions having low heat dissipation.

7. The device according to claim 6, wherein at least some of said measurement areas are arranged near to said heating portions.

8. The device according to claim 6, wherein at least some of said measurement areas are arranged near to said portions having low heat dissipation.

9. A method for determining the position of one or more interfaces between two phases, said phases being selected from the group consisting of a solid phase, a liquid phase and an aeriform phase, said method comprising the steps of:

arranging a device according to claim 1 along a direction transversal to the interface the position of which one wishes to measure, so that said device intersects the interface itself;

one or more of said measurement areas being immersed in each of the phases constituting said interface;

measuring the temperature at said measurement areas.

10. The method according to claim 9, comprising the step of locally increasing the temperature near said measurement areas.

11. The method according to claim 10, comprising the step of determining the heat dissipation values of each measurement area based upon the measured temperature values.

12. The method according to claim 11, comprising the step of determining the position of the solid-liquid and liquid-aeriform interfaces from said heat dissipation values of each measurement area.

* * * * *